April 24, 1951 — B. B. BOURQUE — 2,550,217

FISH STRINGER

Filed Oct. 15, 1948

Bernard B. Bourque
INVENTOR.

BY Clarence A. O'Brien
and Harvey B. Jacobson
Attorneys

Patented Apr. 24, 1951

2,550,217

UNITED STATES PATENT OFFICE 2,550,217

FISH STRINGER

Bernard B. Bourque, Columbus, Ga.

Application October 15, 1948, Serial No. 54,652

5 Claims. (Cl. 224—7)

This invention relates to new and useful improvements in fish stringers and has for its primary object to provide a fish stringing assembly of a simple, dependable and inexpensive construction.

Another important object of this invention is to provide a fish stringer with improved means whereby the fish are conveniently inserted and reliably retained on the stringing line but from which the fish may be easily removed.

These and ancillary objects and meritorious structural features are attained by this invention, a preferred embodiment of which is set forth in the following description and illustrated in the accompanying drawings, wherein.

Referring now more specifically to the drawings, the fish stringer, generally designated by the character reference 10 includes a stringing line 12 of any suitable length and formed from any type of flexible cord, chain or the like. The stringing line is provided at one end with means whereby the fish may be inserted onto the line, the means including a stringing needle 14 having a fared point 16 at one end and a socket 18 at the other end. The socket 18 is adapted to receive one end of the stringing line 12, the stringing line being secured in the socket in any suitable manner as by compressing or corrugating the socket end of the needle as indicated at 20.

Figure 1:
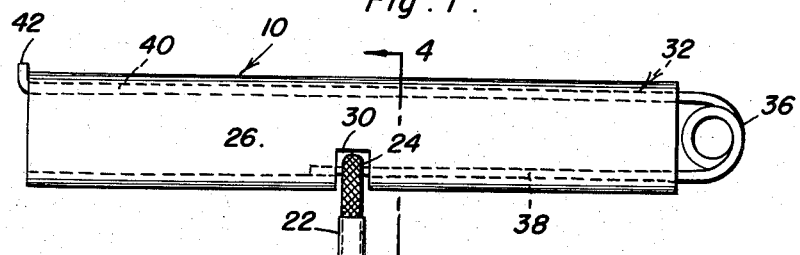
Figure 1 is a view in perspective of a fish stringer, constructed in accordance with the principles of this invention.
Figure 2:
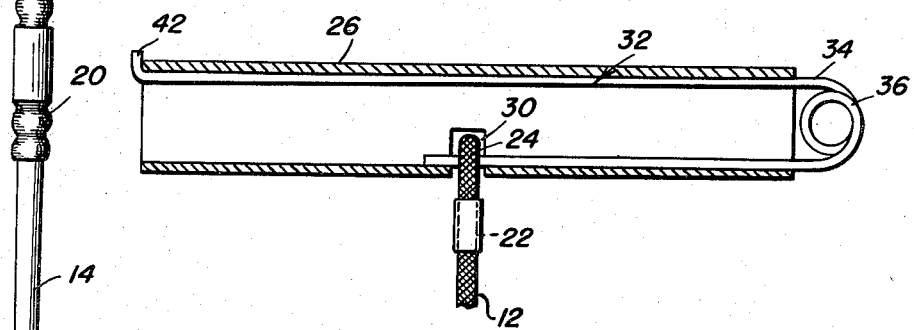
Figure 2 is a longitudinal sectional view through the holder or body member, illustrating in elevation the means provided for detachably locking the stringing line to the holder.
Figure 3:
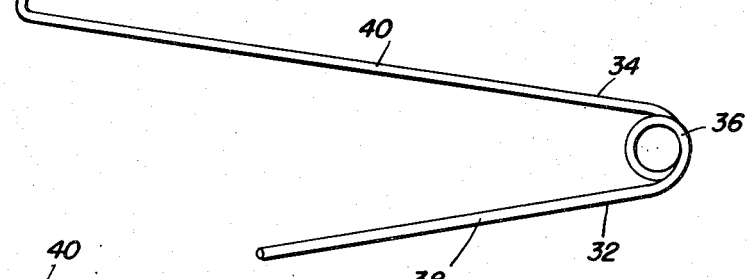
Figure 3 is a view in perspective of the locking means.
Figure 4:
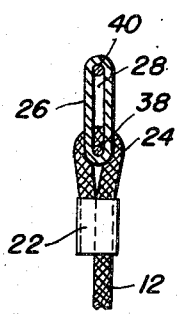
Figure 4 is a transverse sectional view taken on line 4—4, of Figure 1.

The stringing line is provided at its other end with means whereby the fish may be retained on the stringing line or easily and conveniently released therefrom. In this respect, the other end of the stringing line is bent upon itself and secured by a metal sleeve or clip 22, forming an eyelet end 24. A holder or body member 26 is adapted to detachably accommodate the eyelet end of the stringing line for holding and carrying the fish. The body member is preferably of a substantially flat tubular formation, having a longitudinally extending center opening 28. A transverse notch or opening 30 is formed in the body member and the eyelet or loop 24 is detachably held within the opening 30 of the tubular retaining bar or body member 26 by locking or reaining means 32. The retaining means preferably include a flexible retaining member 34, such as heavy wire, spring steel or the like. The retaining member is formed with a loop 36 from which the terminating portions or arms 38 and 40 diverge. The arm 40 is provided at its ends with a lateral extension 42, adapted to engage the end of the retaining bar 26 for locking the member therein, as seen in Figure 2. The arm 38 is adapted for insertion within the loop 24 of the fishing string and holds the same within the retaining bar, as seen in Figure 2.

In operation, the fish will be strung onto the stringing line 12 by inserting the needle 14 therethrough. The loop 24 of the fishing string will be inserted within the notch 30 of the bar 26 and the oppositely extending arms 38 and 40 will be moved together for inserting the retaining member within the opening 28 of the bar. The arm 38 will engage in the loop 24 and hold the same in the bar, while the locking end 42 of the arm 40 will lock the retaining member within the bar.

The fish may be removed from the string by simply unattaching the loop end from the bar by unlocking the hook end 42 and pulling the retaining members from the bar. The fish may then be pulled past the loop end.

It can be seen that there is provided a fish stringing device, which may be conveniently and easily carried in the hand with strung fish caught fast and dependably retained thereby by inserting the needle into the loop 36 of the retaining member.

However, since many other modifications and purposes of this invention will become readily apparent to those skilled in the art upon a perusal of the foregoing description it is to be understood that certain changes in style, size and components may be effected without a departure from the spirit of the invention and within the scope of the appended claims.

Having described the invention, what is claimed as new is:

1. In a fish stringer having a stringing needle and a stringing line with a loop formed at the end of the line opposite the needle, the combination comprising a tubular retaining member for said line, a transverse notch in said member for receiving the loop end of the line and a flexible locking member slidably disposed in said retaining member, said member having opposing arms, one of said arms being engageable with the loop end for holding the same within the retaining member, means formed on the other of said arms for locking the locking member within the retaining member.

2. The combination of claim 1, wherein said last means includes a lateral extension on said arm engageable with one end of the retaining member.

3. The combination of claim 1, wherein said locking member includes a single length of material formed with an integral loop for receiving the needle end of the line.

4. In a fish stringer having a stringing needle and a stringing line with a loop formed at the end of the line opposite the needle, the combination comprising a tubular retaining member for said line, a transverse notch in said member for receiving the loop end of the line and a locking member including a single length of flexible and resilient material having opposing arms joined by an integral loop, said arms being slidably disposed in said retaining member for engaging the loop end and for locking the locking member therein, said loop being adapted to lockingly receive the needle.

5. In a fish stringer having a stringing needle and a stringing line with a loop formed at the end of the line opposite the needle, the combination comprising a tubular holder for said line, said holder being formed with a transverse notch for receiving the loop end of the line, and a locking member for said line and needle, said locking member including a single length of flexible material bent upon itself to form a loop for receiving the needle end and to form a pair of oppositely disposed diverging arms, said arms being slidably disposed in said holder, one of said arms being engageable in the line loop and the other being formed with a lateral end extension engageable on the outer end of the holder for locking the locking member therein.

BERNARD B. BOURQUE.

REFERENCES CITED

The following references are of record in the file of this patent:

UNITED STATES PATENTS

| Number | Name | Date |
|---|---|---|
| 413,661 | Harman | Oct. 29, 1889 |
| 928,427 | Coleman | July 20, 1909 |
| 1,417,759 | McNiece | May 30, 1922 |